(12) United States Patent
Kuo et al.

(10) Patent No.: US 9,117,299 B2
(45) Date of Patent: Aug. 25, 2015

(54) INVERSE REQUEST AGGREGATION

(71) Applicant: Apple Inc., Cupertino, CA (US)

(72) Inventors: Albert C. Kuo, Mountain View, CA (US); Peter F. Holland, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 133 days.

(21) Appl. No.: 13/889,816

(22) Filed: May 8, 2013

(65) Prior Publication Data
US 2014/0333643 A1 Nov. 13, 2014

(51) Int. Cl.
G09G 5/36 (2006.01)
G06T 1/60 (2006.01)

(52) U.S. Cl.
CPC ........................ *G06T 1/60* (2013.01)

(58) Field of Classification Search
CPC ...... G06T 1/60; G09G 2360/12; G09G 5/001; G06F 1/3225; G06F 1/3228
USPC ................................................ 345/545, 531
See application file for complete search history.

(56) References Cited

U.S. PATENT DOCUMENTS

| | | | |
|---|---|---|---|
| 4,811,205 A | 3/1989 | Normington et al. | |
| 6,005,546 A | 12/1999 | Keene | |
| 7,127,573 B1 | 10/2006 | Strongin et al. | |
| 7,617,344 B2 | 11/2009 | Nozaki et al. | |
| 7,925,804 B2 | 4/2011 | Nara | |
| 8,180,963 B2 | 5/2012 | Conte et al. | |
| 8,180,975 B2 | 5/2012 | Moscibroda et al. | |
| 8,922,571 B2 | 12/2014 | Tripathi et al. | |
| 2001/0042143 A1* | 11/2001 | Ooba et al. ...................... | 710/22 |
| 2003/0169262 A1* | 9/2003 | Lavelle et al. ................ | 345/531 |
| 2006/0044328 A1 | 3/2006 | Rai et al. | |
| 2008/0252647 A1 | 10/2008 | Rai et al. | |
| 2008/0297525 A1 | 12/2008 | Rai | |
| 2011/0169848 A1* | 7/2011 | Bratt et al. .................... | 345/545 |
| 2012/0072679 A1 | 3/2012 | Biswas et al. | |
| 2013/0033510 A1 | 2/2013 | Dou et al. | |
| 2014/0189400 A1* | 7/2014 | Tsao ............................. | 713/323 |

* cited by examiner

*Primary Examiner* — Hau Nguyen
(74) *Attorney, Agent, or Firm* — Rory D. Rankin; Meyertons, Hood, Kivlin, Kowert & Goetzel, P.C.

(57) ABSTRACT

A system and method for efficiently scheduling memory access requests from a display controller pipeline. The display controller monitors the amount of data in the line buffers in the internal pixel-processing pipelines. The display controller waits until the amount of data in a given line buffer has fallen below an amount equal to the pixel width of the region being rendered by the internal pixel-processing pipeline before issuing memory requests to the memory controller. When the memory controller is not processing received memory requests, the memory controller transitions to a low-power state.

20 Claims, 6 Drawing Sheets

US 9,117,299 B2

INVERSE REQUEST AGGREGATION

BACKGROUND OF THE INVENTION

1. Field of the Invention

This invention is related to the field of digital systems and, more particularly, to low power mechanisms for managing displays in digital systems.

2. Description of the Relevant Art

As the power and complexity of computer systems increase, graphics operations are increasingly being performed using dedicated graphics rendering hardware. Accordingly, a graphics processing unit (GPU) may include various built-in and configurable structures within a display pipe for rendering images of pixel data to be presented via a display. These structures may implement various pipeline stages corresponding to, for example, rasterisation, overlaying, blending, clipping, dithering, color space conversion, frame rotation, frame buffering, etc.

In one embodiment, a video subsystem in a computing system may include multiple sources for video data. The design of a smartphone or computer tablet may include user interface layers, cameras, and video sources such as media players. Each of these sources may utilize video data stored in memory. A corresponding display controller may include multiple internal pixel-processing pipelines for these sources. Each memory request sent from the video subsystem includes both overhead processing and information retrieval processing. A large number of requests may create a bottleneck in the memory subsystem, and the repeated overhead processing may reduce the subsystem performance.

In order to minimize power consumption of the overall system, the system should attempt to enter a low-power mode whenever traffic is not being sent over the communication fabric to the memory controller. However, the memory subsystem may be unable to enter a low-power mode as one or more display pipelines continuously access the memory. The memory may be off-die synchronous dynamic random access memory (SDRAM) used to store frame data in frame buffers. The accesses of the SDRAM consume an appreciable amount of power in addition to preventing the memory subsystem from entering a low-power mode.

In view of the above, methods and mechanisms for minimizing the power consumption of a display pipeline are desired.

SUMMARY OF EMBODIMENTS

In one embodiment, a display controller includes circuitry configured to process image data (e.g., still frames and/or video sequences) for visual display. The display controller may include one or more internal pixel-processing pipelines. Each of the internal pixel-processing pipelines may be able to process the frame data received from memory (via the memory controller) for a respective video source. The display controller may be configured to blend one or more still frames and/or sequences to produce output frames. The output frames may be conveyed to and presented on a respective display screen.

The display controller may be configured to transmit read requests to memory via a memory controller in order to retrieve the image data from memory for processing. In one embodiment, after sending a burst of memory requests to the memory controller, each pixel-processing pipeline of the display controller may wait to issue read requests until a programmable number of pixels are left in the line buffer. The programmable number of pixels may be based on a size of the region being rendered by the pixel-processing pipeline.

The display controller may aggregate memory requests for each pixel-processing pipeline to the memory controller while waiting for the number of pixels in the corresponding line buffer to fall below the programmable number of pixels. In response to not receiving memory access requests from the display controller (or any other functional blocks), the memory controller may transition to a low-power mode.

In one embodiment, the display controller may receive an indication that one or more of the programmable numbers of pixels has been updated. The update may be generated based on a change in the size of the region being rendered by a given pixel-processing pipeline. For example, the width of the frame may change from a first width to a second width. Initially, after sending a burst of memory requests, the display controller may be configured to wait until there are a first number of pixels (equal to the first width) left in the line buffer of the given pixel-processing pipeline prior to issuing the next set of read requests to the memory controller. After the display controller receives the indication that the programmable number has been updated to the second number of pixels, the display controller may then wait for the amount of data in the line buffer to fall below the second number of pixels before issuing additional read requests to the memory controller.

These and other embodiments will be further appreciated upon reference to the following description and drawings.

Figure 1:
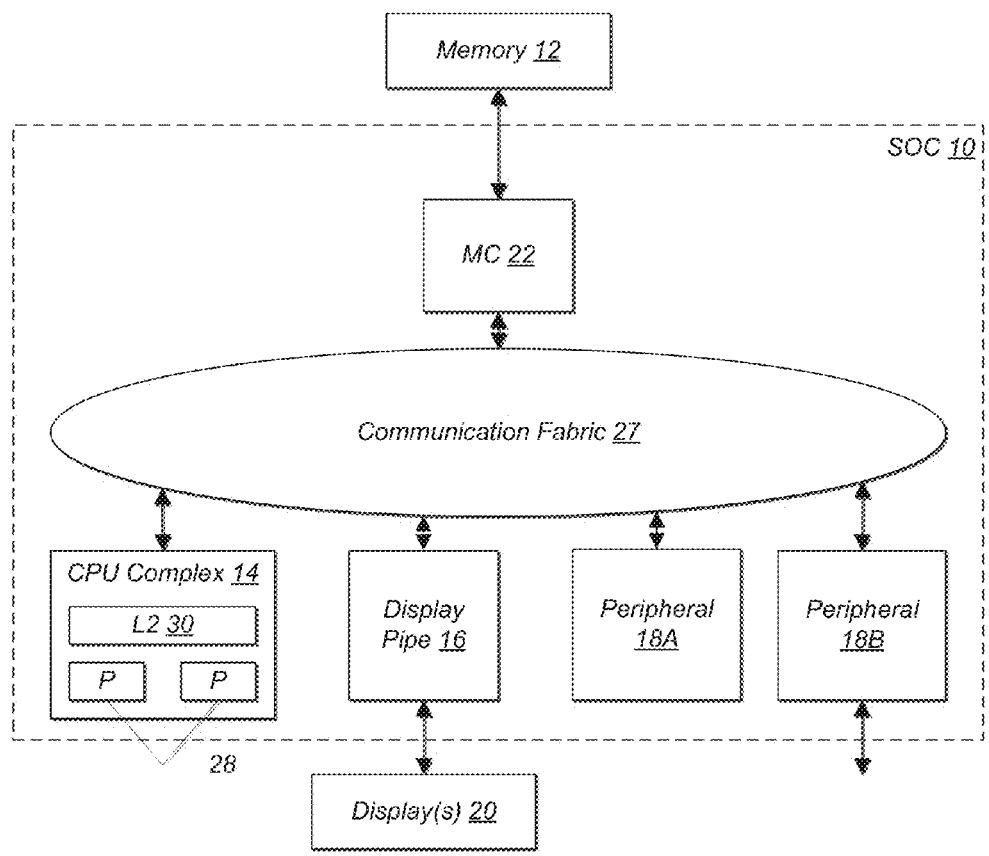
FIG. 1 is a block diagram of one embodiment of a system on a chip (SoC).

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

This specification includes references to "one embodiment". The appearance of the phrase "in one embodiment" in different contexts does not necessarily refer to the same embodiment. Particular features, structures, or characteristics may be combined in any suitable manner consistent with this disclosure. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described or claimed as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six, interpretation for that unit/circuit/component. Additionally, "configured to" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention. It will be appreciated that for simplicity and clarity of illustration, elements shown in the figures have not necessarily been drawn to scale. For example, the dimensions of some of the elements may be exaggerated relative to other elements.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "An apparatus comprising a display controller . . . . " Such a claim does not foreclose the apparatus from including additional components (e.g., a CPU complex, a communication fabric).

"First," "Second," etc. As used herein, these terms are used as labels for nouns that they precede, and do not imply any type of ordering (e.g., spatial, temporal, logical, etc.). For example, in a display controller with a plurality of pixel-processing pipelines, the terms "first" and "second" pixel-processing pipelines can be used to refer to any two of the plurality of pixel-processing pipelines.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Turning now to FIG. 1, a block diagram of one embodiment of a system on chip (SOC) 10 is shown coupled to a memory 12 and one or more display devices 20. A display device may be more briefly referred to herein as a display. As implied by the name, the components of the SOC 10 may be integrated onto a single semiconductor substrate as an integrated circuit "chip." In some embodiments, the components may be implemented on two or more discrete chips in a system. However, the SOC 10 will be used as an example herein. In the illustrated embodiment, the components of the SOC 10 include a central processing unit (CPU) complex 14, a display pipe 16, peripheral components 18A-18B (more briefly, "peripherals"), a memory controller 22, and a communication fabric 27. The components 14, 16, 18A-18B, and 22 may all be coupled to the communication fabric 27. The memory controller 22 may be coupled to the memory 12 during use. Similarly, the display pipe 16 may be coupled to the displays 20 during use. In the illustrated embodiment, the CPU complex 14 includes one or more processors 28 and a level two (L2) cache 30.

The display pipe 16 may include hardware to process one or more still images and/or one or more video sequences for display on the displays 20. Generally, for each source still image or video sequence, the display pipe 16 may be configured to generate read memory operations to read the data representing the frame/video sequence from the memory 12 through the memory controller 22. In one embodiment, each read operation may include a quality of service (QoS) parameter that specifies the requested QoS level for the operation. The QoS level may be managed to ensure that the display pipe 16 is provided with data in time to continue displaying images without visual artifacts (e.g., incorrect pixels being displayed, "skipping", or other visually-identifiable incorrect operation).

The display pipe 16 may be configured to perform any type of processing on the image data (still images, video sequences, etc.). In one embodiment, the display pipe 16 may be configured to scale still images and to dither, scale, and/or perform color space conversion on the frames of a video sequence. The display pipe 16 may be configured to blend the still image frames and the video sequence frames to produce output frames for display. The display pipe 16 may also be more generally referred to as a display controller. A display controller may generally be any hardware configured to prepare a frame for display from one or more sources, such as still images and/or video sequences.

The displays 20 may be any sort of visual display devices. The displays may include, for example, touch screen style displays for mobile devices such as smart phones, tablets, etc. Various displays 20 may include liquid crystal display (LCD), light emitting diode (LED), plasma, cathode ray tube (CRT), etc. The displays may be integrated into a system including the SOC 10 (e.g. a smart phone or tablet) and/or may be a separately housed device such as a computer monitor, television, or other device. The displays may also include displays coupled to the SOC 10 over a network (wired or wireless).

In some embodiments, the displays 20 may be directly connected to the SOC 10 and may be controlled by the display pipe 16. That is, the display pipe 16 may include hardware (a "backend") that may provide various control/data signals to the display, including timing signals such as one or more clocks and/or the vertical blanking interval and horizontal blanking interval controls. The clocks may include the pixel clock indicating that a pixel is being transmitted. The data signals may include color signals such as red, green, and blue, for example. The display pipe 16 may control the displays 20 in real-time, providing the data indicating the pixels to be displayed as the display is displaying the image indicated by the frame. The interface to such displays 20 may be, for example, VGA, HDMI, digital video interface (DVI), a liquid crystal display (LCD) interface, a plasma interface, a cathode ray tube (CRT) interface, any proprietary display interface, etc.

The CPU complex 14 may include one or more CPU processors 28 that serve as the CPU of the SOC 10. The CPU of the system includes the processor(s) that execute the main control software of the system, such as an operating system.

Generally, software executed by the CPU during use may control the other components of the system to realize the desired functionality of the system. The CPU processors 28 may also execute other software, such as application programs. The application programs may provide user functionality, and may rely on the operating system for lower level device control. Accordingly, the CPU processors 28 may also be referred to as application processors. The CPU complex may further include other hardware such as the L2 cache 30 and/or an interface to the other components of the system (e.g., an interface to the communication fabric 27).

The peripherals 18A-18B may be any set of additional hardware functionality included in the SOC 10. For example, the peripherals 18A-18B may include video peripherals such as video encoder/decoders, image signal processors for image sensor data such as camera, scalers, rotators, blenders, graphics processing units, etc. The peripherals may include audio peripherals such as microphones, speakers, interfaces to microphones and speakers, audio processors, digital signal processors, mixers, etc. The peripherals may include interface controllers for various interfaces external to the SOC 10 (e.g., the peripheral 18B) including interfaces such as Universal Serial Bus (USB), peripheral component interconnect (PCI) including PCI Express (PCIe), serial and parallel ports, etc. The peripherals may include networking peripherals such as media access controllers (MACs). Any set of hardware may be included.

The memory controller 22 may generally include the circuitry for receiving memory operations from the other components of the SOC 10 and for accessing the memory 12 to complete the memory operations. The memory controller 22 may be configured to access any type of memory 12. For example, the memory 12 may be static random access memory (SRAM), dynamic RAM (DRAM) such as synchronous DRAM (SDRAM) including double data rate (DDR, DDR2, DDR3, etc.) DRAM. Low power/mobile versions of the DDR DRAM may be supported (e.g. LPDDR, mDDR, etc.). The memory controller 22 may include various queues for buffering memory operations, data for the operations, etc., and the circuitry to sequence the operations and access the memory 12 according to the interface defined for the memory 12.

The communication fabric 27 may be any communication interconnect and protocol for communicating among the components of the SOC 10. The communication fabric 27 may be bus-based, including shared bus configurations, cross bar configurations, and hierarchical buses with bridges. The communication fabric 27 may also be packet-based, and may be hierarchical with bridges, cross bar, point-to-point, or other interconnects.

It is noted that the number of components of the SOC 10 (and the number of subcomponents for those shown in FIG. 1, such as within the CPU complex 14) may vary from embodiment to embodiment. There may be more or fewer of each component/subcomponent than the number shown in FIG. 1.

Figure 2:
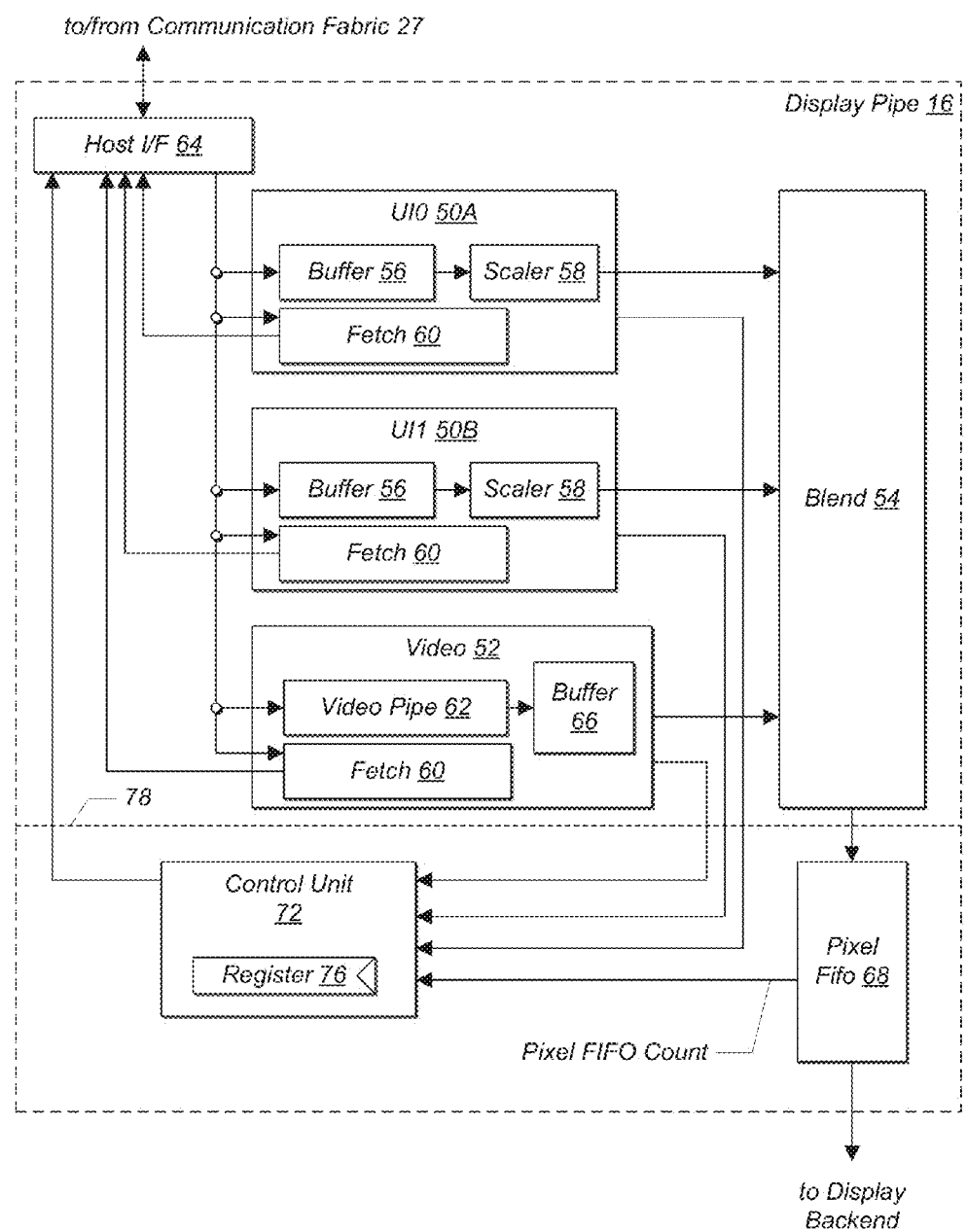
FIG. 2 is a generalized block diagram of one embodiment of a portion of a display pipe.

Turning now to FIG. 2, a block diagram of one embodiment of a portion of the display pipe 16 is shown. There may be additional circuitry (e.g., the display backend referenced in FIG. 2) to directly interface to the display 20 to display pixels generated by the display pipe 16. In some embodiments, there may be multiple instances of the display pipe 16 for coupling to multiple displays 20.

As shown in FIG. 2, the display pipe 16 may include one or more user interface (UI) units, two shown as UI0 50A and UI 50B in this case. One or more video units such as video unit 52 may also be included, along with a blend unit 54. It is noted that in other embodiments, generic pipeline units may be utilized rather than UI and video units as shown in FIG. 2. Each generic pipeline unit may perform the functions of a UI or video unit as required by the overall display pipe. In some embodiments, the generic pipeline may be configured by software and may be programmed as a UI unit and then later reprogrammed as a video unit (or vice versa). A host interface unit (host I/F) 64 may also be included within display pipe 16. An output pixel buffer 68 (or a pixel first-in, first-out buffer (FIFO)) and control unit 72 are also shown. In various embodiments, control unit 72 may include various circuitry (e.g., QoS control circuit, clock gate control circuit) not shown in FIG. 2 to avoid obscuring the figure.

In the illustrated embodiment, the host interface unit 64 may be coupled to the user interface units 50A-50B, the video unit 52, and control unit 72. The user interface units 50A-50B and the video unit 52 may further be coupled to the blend unit 54. The blend unit 54 may be coupled to the pixel FIFO 68. Control unit 72 may be coupled to receive buffer occupancy indications from the user interface units 50A-50B and the video unit 52. In one embodiment, control unit 72 may include a clock gate control circuit configured to control clock gating in a portion of the display pipe 16. Particularly, the portion above the dashed line 78 in FIG. 2 may be able to be clock gated. Control unit 72 may also be coupled to receive a pixel FIFO count from the pixel FIFO 68.

The pixel FIFO 68 may be the interface to the display backend, which may control the display 20 to display the pixels generated by the display pipe 16. The display backend may read pixels at a regular rate from the pixel FIFO 68 according to a pixel clock. The rate may depend on the resolution of the display as well as the refresh rate of the display. For example, a display having a resolution of N×M and a refresh rate of R frames per second may have a pixel clock frequency based on N×M×R. On the other hand, the pixel FIFO 68 may be written by the blend unit 54 as pixels are generated by the blend unit 54. In some instances, the rate at which the display pipe 16 generates pixels may be faster than the rate at which the pixels are read, assuming that data is provided to the display pipe 16 from the memory 12 quickly enough.

The pixels in the pixel FIFO 68 may thus be a measure of a margin of safety for the display pipe 16 before erroneous operation may be observed on the display 20. Control unit 72 may be configured to generate QoS levels based on the number of pixels in the pixel FIFO 68. Control unit 72 may provide the generated QoS level to the host interface unit 64, which may transmit the QoS level with each memory read operation to the memory controller 22. Control unit 72 may also determine when to clock gate the display pipe 16 based on the comparison of the number of pixels in the pixel FIFO 68 to a threshold. Additionally, in some embodiments, the amount of data that is available within the display pipe 16 to generate additional pixels for the pixel FIFO 68 may be viewed as additional margin of safety.

Each user interface unit 50A-50B may include instances of a buffer 56, a scaler 58, and a fetch unit 60. The buffer 56 may be coupled to receive image data from the host interface unit 64 and to provide the data to the scaler 58. The scaler 58 may be configured to output pixels to the blend unit 54 with an alpha value for blending. The fetch unit 60 may be coupled to provide memory operations to the host interface unit 64 for transmission to the memory controller 22. The video unit 52 may include a video pipe 62, a video output buffer 66, and one or more fetch units 60. For example, the video unit 52 may include a fetch unit 60 for each image plane in the video sequence. The various image planes may describe the video image. For example, the image planes may be color planes (e.g. red, green, blue or Y, Cr, Cb). The fetch unit(s) 60 in the video unit 52 may be coupled to provide memory operations to the host interface unit 64. The video pipe 62 may be coupled to receive video image data from the host interface unit 64.

The buffers 56 may be input line buffers. That is, the buffers 56 may store lines of data corresponding to lines of the input frame. For vertical downscaling, data from adjacent lines of the input frame may be needed to generate each output pixel, and thus the line buffers may provide space to store data for processing. The data may be the color data for each pixel, as well as an alpha value for blending. The buffer 66 may be an output buffer of video frame pixels. The pixels in the buffer 66 may already have been scaled, if applicable, and may be ready for blend unit 54 to produce output pixels for the output pixel FIFO 68.

Generally, the image data input to each of the units 50A-50B and 52 may describe the source image to be displayed. In an embodiment, the image data for a user interface image input to the units 50A and 50B may include pixel data and an alpha value for blending. The pixel data may describe a color for each pixel. The scaled pixels may be provided as output pixels from the user interface units 50A and 50B to the blend unit 54, along with the alpha values. In an embodiment, the user interface units 50A-50B may support programmable active regions in the source image. The active regions may define the only portions of the source image to be displayed. In an embodiment, the user interface units 50A-50B may be configured to only fetch data within the active regions. Outside of the active regions, dummy data with an alpha value of zero may be passed as the pixel data.

In one embodiment, the video pipe 62 may receive fetched image data describing a sequence of frames to be displayed at a frame rate specified for the video sequence. In an embodiment, the video sequence data may be in YCbCr format, and the video unit 62 may be configured to color space cover the frames to RGB for blend with the frames from the user interface units 50A-50B. The video pipe 62 may insert random noise (dither) into the data and may optionally scale the data in one or both of vertical and horizontal directions.

The blend unit 54 may receive frames of pixels from the user interface units 50A-50B and the video unit 52, and may be configured to blend them together layer by layer. The final resultant pixels may be queued in the output pixel FIFO 68. The lowest level layer in the blend unit 54 may be defined as the background color. Layer 1 may blend with layer 0. The next layer, layer 2, may blend with the blended layers 0 and 1, and so on until all the layers are blended.

Each of the units 50A-50B and 52 may include pipelined hardware that performs the operations assigned to that unit. Accordingly, each of the units 50A-50B and 52 may be referred to as a pipeline or pipe. Thus, the user interface units 50A-50B may be user interface pipes, static frame/image pipes, or user interface pixel-processing pipelines. The video unit 52 may be referred to as a video pipe, video sequence pipe, or video interface pixel-processing pipeline.

In the illustrated embodiment, the control unit 72 includes register 76 configured to store thresholds corresponding to the line buffers of the pixel-processing pipelines. The value of each threshold may be calculated based on the active region being rendered by the corresponding pixel-processing pipeline. Control unit 72 may also be coupled to receive buffer occupancy indications for each of the pixel-processing pipelines. Control unit 72 may compare a buffer occupancy indication to a corresponding threshold to determine whether to issue read requests to the memory controller for a given pixel-processing pipeline.

It may be advantageous in some systems to generate memory requests in bursts rather than generating memory requests that are spread out evenly over time. In some cases, a reduction in power consumption may be achieved by operating in burst modes where large amounts of memory requests are sent out rapidly over a short period of time followed by a long period of time of inactivity. During the inactivity, the memory controller and communication fabric may be able to enter a low power state that reduces the power consumption of the electronic device. The inverse request aggregation techniques disclosed herein offer many advantages over the prior art. For example, one advantage of inverse request aggregation is that it allows the display pipeline to aggregate the maximum number of requests possible with no risk of under run. Additionally, setting an occupancy threshold guarantees a fixed latency tolerance regardless of whether a full screen worth or only a portion of pixels are being fetched. In one embodiment, the latency tolerance may be a function of the display resolution and the scaling factor (if any). Therefore, the threshold may be set based on those two factors. In some embodiments, the display resolution may be fixed for a specific screen and the screen's physical characteristics may not change dynamically. In these embodiments, the aggregation threshold may effectively be a function of the scaling factor.

Figure 3:
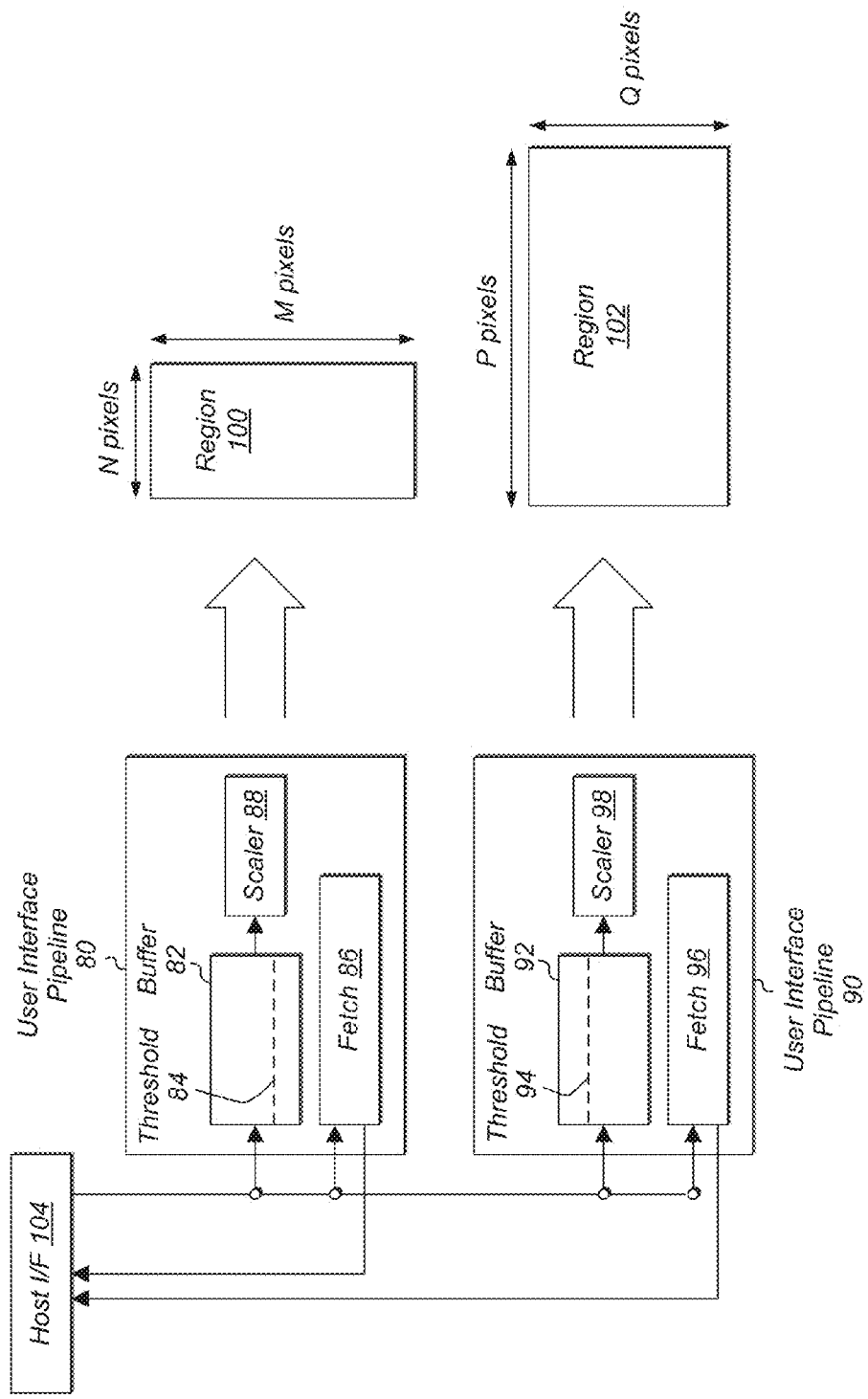
FIG. 3 is a generalized block diagram of user interface pixel-processing pipelines.

Turning now to FIG. 3, a generalized block diagram of one embodiment of user interface (UI) pixel-processing pipelines within the display pipeline is shown. The example shown in FIG. 3 with the user interface pipelines 80 and 90 rendering regions 100 and 102, respectively, is for illustrative purposes only. As shown in FIG. 3, user interface pipeline 80 is rendering user interface region 100 with a size of N pixels wide by M pixels tall. The values N and M may vary according to the particular region being rendered. In one embodiment, the value of N may determine the location of threshold 84 in buffer 82. Additionally, in some embodiments, the size of region 100 may change at any time, and so the user interface pipeline 80 may also adjust its operation to match the region being rendered. Similarly, user interface pipeline 90 is rendering user interface region 102 with a size of P pixels wide by Q pixels tall. The value P may determine the location of threshold 94 in buffer 92.

After receiving a first burst of pixels, fetch unit 86 may be configured to wait until there are N pixels left before issuing memory requests to host interface (I/F) unit 104 for additional pixels. In one embodiment, fetch unit 86 may be configured to monitor buffer 82 and determine when there are N pixels remaining. Alternatively, a control unit (not shown) may monitor buffer 82, and fetch unit 86 may receive an indication from the control unit to start issuing memory requests. The above description of fetch unit 86 may also apply to fetch unit 96.

In the embodiment shown in FIG. 3, the regions 100 and 102 are of different sizes, with N not equal to P and M not equal to Q. However, this is for illustrative purposes only. In another embodiment, region 100 and 102 may be the same size. Alternatively, in another embodiment, N and P may be equal while M is different than Q. Or in a further embodiment, M and Q may be equal while N is different than P.

In one embodiment, user interface pipelines 80 and 90 may not perform any scaling of the received pixel data. In other embodiments, either of user interface pipelines 80 or 90 may utilize scaling, in which case the threshold used in the corresponding line buffer will be scaled accordingly. For example, if a given pipeline were upscaling by a factor of two and the width of the region being rendered is N pixels, then the threshold for the line buffer may be N/2 pixels. In this way, each threshold may reflect the quantity of output equivalent pixels in the buffer that is equal to a single line in the region being rendered.

Figure 4:
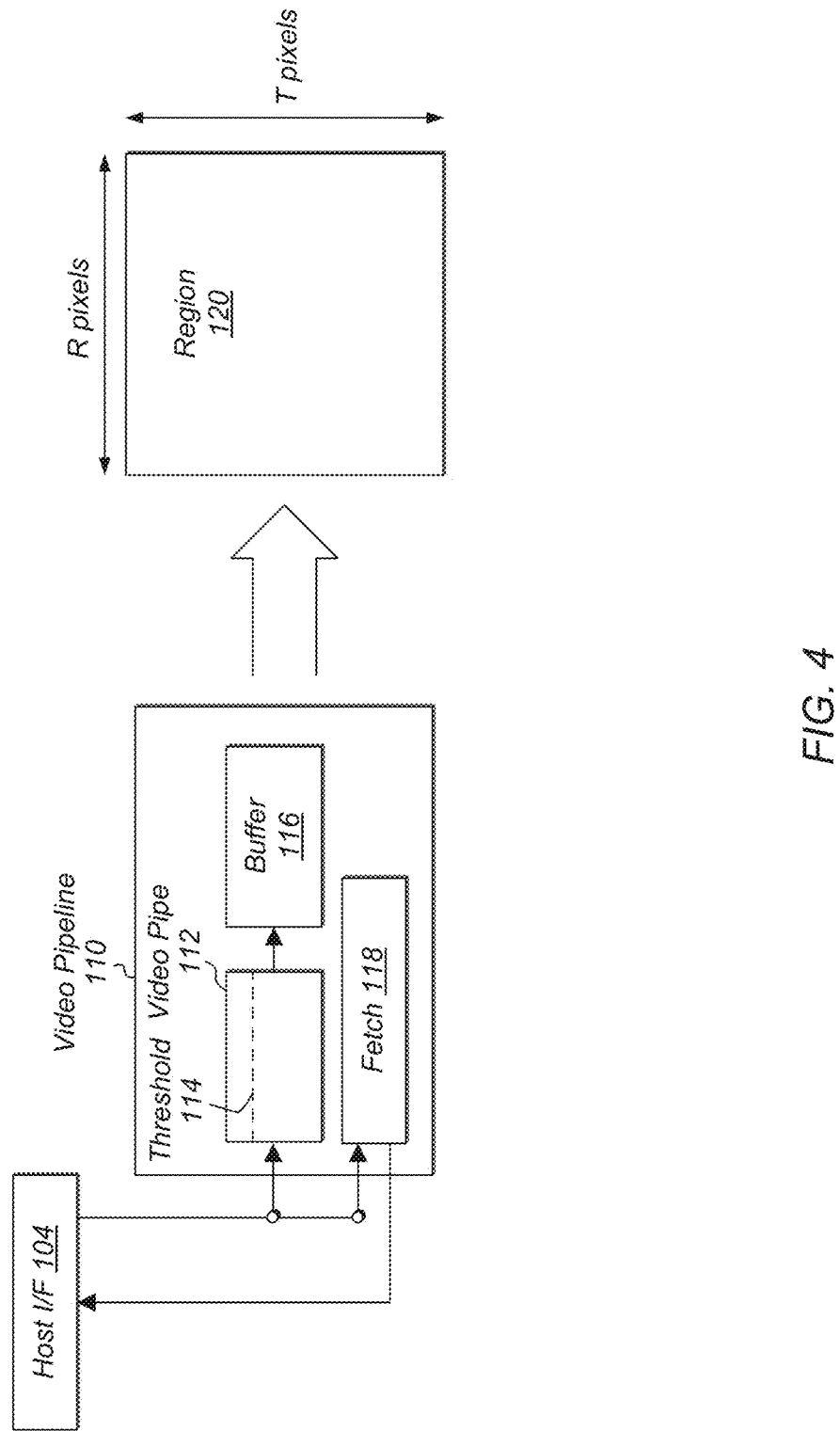
FIG. 4 is a generalized block diagram of a video pixel-processing pipeline.

Turning now to FIG. 4, a block diagram of one embodiment of a video pixel-processing pipeline is shown. In one embodiment, video pipeline 110 may be included within a display pipeline that also includes user interface pipelines 80 and 90 (of FIG. 3). Video pipeline 110 may be coupled to host interface (I/F) unit 104 and to a blend unit (not shown). Video pipeline 110 may receive frame data from a memory controller via host I/F unit 104. Video pipeline 110 may process the frame data and send the processed frame data to the blend unit to be blended with one or more user interface pipelines.

As shown in FIG. 4, video pipeline 110 may be rendering region 120 of size R pixels wide by T pixels tall. Video pipe 112 may include a line buffer (not shown) and additional logic, including dither unit, scaler, etc. Threshold 114 of video pipe 112 may be set based on the width of R pixels. For example, if R is equal to 20 pixels, and there are 4 bytes per pixel, then threshold 114 may be set for 80 bytes for the line buffer of video pipe 112. These values of R and the number of bytes per pixel are for illustrative purposes only. Other values of R and other numbers of bytes per pixel may be utilized in other embodiments. When the size of region 120 changes, threshold 114 may be updated to reflect the new width of region 120. Also, if the type of scaling used by video pipe 112 changes, threshold 114 may be updated to match the amount of scaling being utilized.

A control unit (not shown) may monitor the amount of data stored in video pipe 112 and detect when the amount of data is less than threshold 114. While the amount of data stored in buffer video pipe 112 is above the threshold, fetch unit 118 may aggregate memory requests for frame data. When the control unit detects that the amount of data has fallen below threshold 114, then the control unit may signal fetch unit 118 to begin issuing memory requests.

Figure 5:
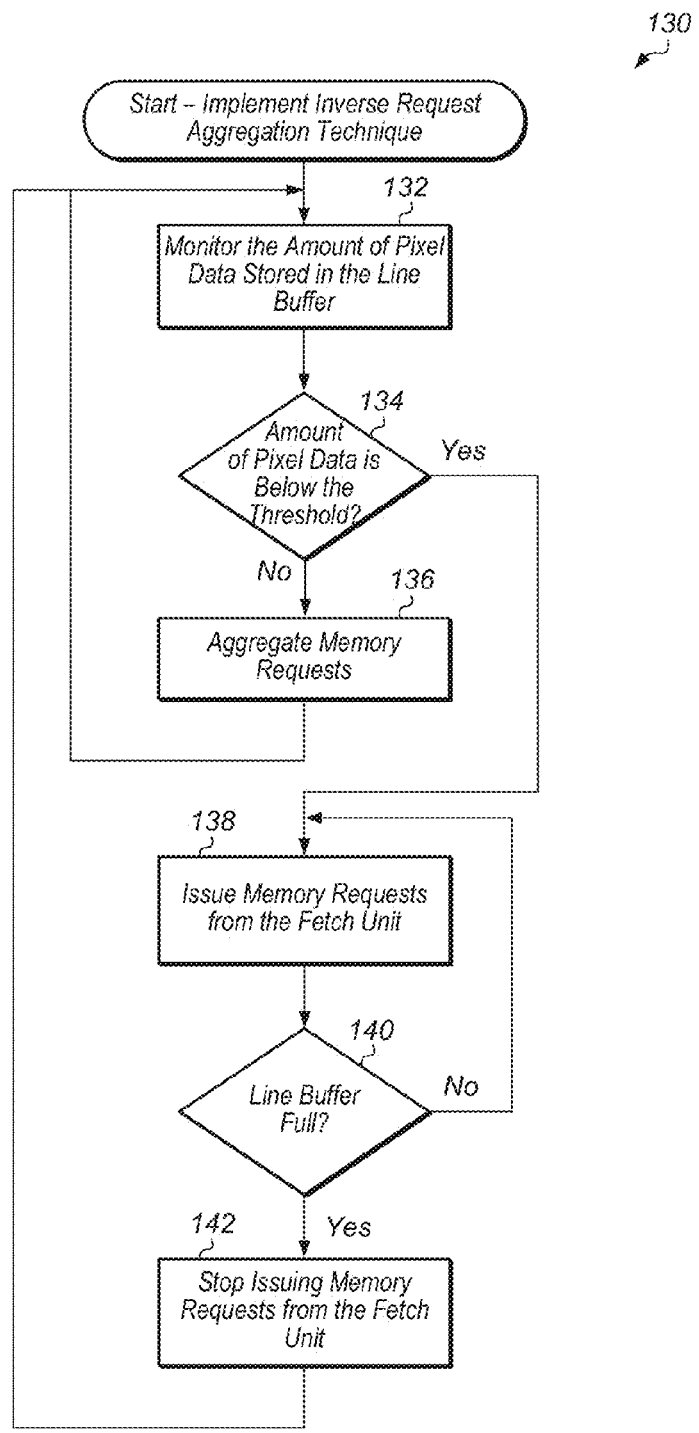
FIG. 5 is a generalized flow diagram of one embodiment of a method for implementing an inverse request aggregation technique within a display pipeline.

Turning now to FIG. 5, a generalized flow diagram of one embodiment of a method 130 for implementing an inverse request aggregation technique within a display pipeline is shown. For purposes of discussion, the steps in this embodiment are shown in sequential order. However, in other embodiments some steps may occur in a different order than shown, some steps may be performed concurrently, some steps may be combined with other steps, and some steps may be omitted.

In one embodiment, the control unit of a given internal pixel-processing pipeline may monitor the amount of data stored in the line buffer as data is forwarded from the line buffer to the next stage of the given pixel-processing pipeline (block 132). If the amount of data stored in the line buffer is less than the threshold (conditional block 134, "yes" leg), then the fetch unit of the given pixel-processing pipeline may issue memory requests for additional pixel data (block 138). In one embodiment, the fetch unit may send memory requests to the interface unit of the display pipe, and the interface unit may arbitrate among requests for forwarding to the memory controller. In one embodiment, the control unit may set the threshold of the line buffer of the given internal pixel-processing pipeline based on the width of the line of the region being rendered. The width of the line may be calculated in terms of the amount of data per line of the region based on the number of pixels in the line and the number of bits per pixel. The value of the threshold may also be based on the type of scaling that is being performed by the given internal pixel-processing pipeline.

If the amount of data stored in the line buffer is above the threshold (conditional block 134, "no" leg), then the fetch unit may aggregate memory requests and prevent the memory requests from being issued (block 136). After block 136, method 130 may return to block 132 and monitor the amount of pixel data in the line buffer.

After block 138, the control unit may monitor the line buffer and determine if the line buffer is full (conditional block 140). Alternatively, the fetch unit or another logical unit may monitor the line buffer and determine if the line buffer is full. The line buffer may be considered full if all of the line buffer entries are either filled with pixel data or are reserved for pixel data that has been fetched but not yet returned. If the line buffer is full (conditional block 140, "yes" leg), then the fetch unit may stop issuing memory requests (block 142). After block 142, method 130 may return to block 132 and monitor the amount of pixel data in the line buffer. If the line buffer is not full (conditional block 140, "no" leg), then method 130 may return to block 138 and the fetch unit may continue issuing memory requests. It is noted that method 130 may be performed in parallel for multiple internal pixel-processing pipelines (user interface and video interface) of the display pipeline.

Figure 6:
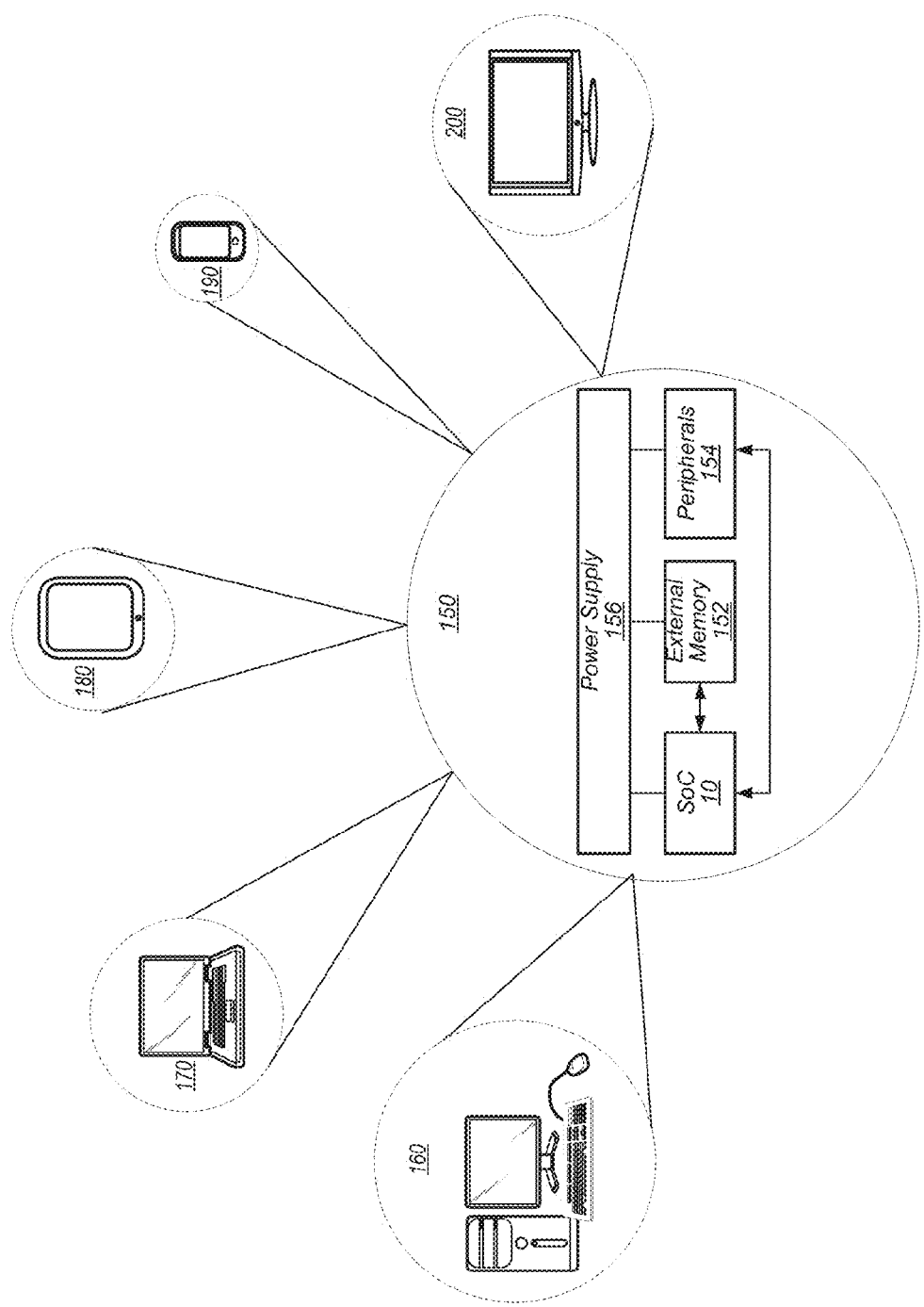
FIG. 6 is a block diagram of one embodiment of a system.

Referring next to FIG. 6, a block diagram of one embodiment of a system 150 is shown. As shown, system 150 may represent chip, circuitry, components, etc., of a desktop computer 160, laptop computer 170, tablet computer 180, cell phone 190, television 200 (or set top box configured to be coupled to a television), or otherwise. Other devices are possible and are contemplated. In the illustrated embodiment, the system 150 includes at least one instance of SoC 10 (of FIG. 1) coupled to an external memory 152.

SoC 10 is coupled to one or more peripherals 154 and the external memory 152. A power supply 156 is also provided which supplies the supply voltages to SoC 10 as well as one or more supply voltages to the memory 152 and/or the peripherals 154. In various embodiments, power supply 156 may represent a battery (e.g., a rechargeable battery in a smart phone, laptop or tablet computer). In some embodiments, more than one instance of SoC 10 may be included (and more than one external memory 152 may be included as well).

The memory 152 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with SoC 10 in a chip-on-chip configuration, a package-on-package configuration, or a multi-chip module configuration.

The peripherals 154 may include any desired circuitry, depending on the type of system 150. For example, in one embodiment, peripherals 154 may include devices for various types of wireless communication, such as wifi, Bluetooth, cellular, global positioning system, etc. The peripherals 154 may also include additional storage, including RAM storage, solid state storage, or disk storage. The peripherals 154 may include user interface devices such as a display screen, including touch display screens or multitouch display screens, keyboard or other input devices, microphones, speakers, etc.

The device driver for the display controller may include both user-mode components and kernel-mode components. A graphics hardware vendor may supply the user-mode graphics driver and the kernel-mode graphics driver. The operation system (OS) may load a separate copy of the user-mode driver for each application. The user-mode graphics driver may be a dynamic-link library (DLL) that is loaded by corresponding application programming interfaces (APIs) in the OS graphics APIs. Alternatively, runtime code may be used to install the user-mode graphics driver.

In various embodiments, corresponding graphics libraries and drivers may determine and pass the aggregate threshold from the software application to the computing system, such as to a programmable configuration register within the display controller. In some cases, the user-mode graphics driver may be an extension to the Direct3D and OpenGL software development kits (SDKs). Accordingly, the determination and passing of the aggregate threshold may be made available through a standard interface.

In some embodiments, one or more counters may be used to measure the time duration between separate requestors being selected by arbitration logic and sending an initial memory read request. Additionally, the time duration between a same requestor being selected by arbitration logic during a requestor aggregate mode and sending an initial memory read request may be measured. The recorded times may be compared to given values, such as expected signatures, in order to debug the system and make adjustments to the programmable aggregate threshold and the number of requests to send within a burst mode.

In various embodiments, program instructions of a software application may be used to implement the methods and/or mechanisms previously described. The program instructions may describe the behavior of hardware in a high-level programming language, such as C. Alternatively, a hardware design language (HDL) may be used, such as Verilog. The program instructions may be stored on a computer readable storage medium. Numerous types of storage media are available. The storage medium may be accessible by a computer during use to provide the program instructions and accompanying data to the computer for program execution. In some embodiments, a synthesis tool reads the program instructions in order to produce a netlist comprising a list of gates from a synthesis library.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus comprising:
a memory controller configured to control access to a memory; and
a display controller comprising a display pipeline configured to read frame data stored in the memory for an image to be presented on a display;
wherein after receiving frame data corresponding to a first plurality of memory requests, the display controller is configured to:
monitor an amount of frame data stored in a line buffer of a first internal pixel-processing pipeline of the display pipeline; and
aggregate received memory requests in response to detecting the amount of frame data stored in the line buffer is above a threshold amount of data, wherein memory requests are not permitted to issue to the memory controller while received memory requests are aggregated.

2. The apparatus as recited in claim 1, wherein the amount of frame data comprises a first number of pixels that is equal to a line width of a region being rendered by a first internal pixel-processing pipeline.

3. The apparatus as recited in claim 2, wherein the display controller is further configured to stop issuing memory requests from the first internal pixel-processing pipeline to the memory controller responsive to detecting the line buffer is full.

4. The apparatus as recited in claim 3, wherein in response to receiving no accesses from the display pipeline, the memory controller is configured to transition to a low-power mode.

5. The apparatus as recited in claim 1, wherein in response to detecting the amount of frame data stored in the line buffer is below the threshold, the display controller is configured to:
issue memory requests for frame data to the memory controller; and
stop issuing memory requests for frame data to the memory controller, responsive to detecting the line buffer is full.

6. The apparatus as recited in claim 1, wherein the threshold is programmable.

7. The apparatus as recited in claim 1, wherein the line buffer is considered full if all line buffer entries are reserved for pixel data that has been fetched but not yet returned.

8. The apparatus as recited in claim 1, wherein the display pipeline comprises a plurality of internal pixel-processing pipelines, and wherein each internal pixel-processing pipeline is configured to send memory requests to the memory controller.

9. The apparatus as recited in claim 1, wherein the threshold is based at least in part on at least one of a display resolution and a scaling factor.

10. The apparatus as recited in claim 1, wherein the apparatus is a system-on-a-chip (SOC).

11. A method comprising:
monitoring an amount of data stored in a line buffer of a first internal pixel-processing pipeline of a display pipeline;
generating memory requests to read frame data stored in a memory, wherein the frame data corresponds to a region being rendered by the first internal pixel-processing pipeline; and
responsive to detecting the amount of frame data is above a threshold amount of data, aggregating received memory requests, wherein memory requests are not permitted to issue to the memory controller while received memory requests are aggregated.

12. The method as recited in claim 11, wherein in response to receiving no accesses from the display pipeline, the method further comprises transitioning the memory controller to a low-power mode.

13. The method as recited in claim 12, further comprising wherein in response to detecting the amount of frame data stored in the line buffer is below the threshold:
issuing memory requests for frame data to the memory controller; and
stopping issue of memory requests for frame data to the memory controller, responsive to detecting the line buffer is full.

14. The method as recited in claim 13, wherein as the display pipeline is sending memory requests to the memory controller, the method further comprises performing arbitration between at least two active requestors among a plurality of internal pixel-processing pipelines of the display pipeline.

15. A display controller comprising:
an interface configured to receive frame data for an image to be presented on a display;
a display pipeline comprising a plurality of internal pixel-processing pipelines, wherein the display pipeline is configured to process the received frame data for the display; and
a control unit, wherein the control unit is configured to:
monitor an amount of data in a first line buffer of a first internal pixel-processing pipeline; and
aggregate received memory requests in response to detecting the amount of frame data is above a threshold amount of data, wherein memory requests are not permitted to issue to the memory controller while received memory requests are aggregated.

16. The display controller as recited in claim 15, wherein the control unit is further configured to:
monitor an amount of data in a second line buffer of a second internal pixel-processing pipeline; and
prevent memory requests from being issued for the second internal pixel-processing until the amount of data in the second line buffer is less than a second programmable threshold, wherein the second programmable threshold is different than the first programmable threshold.

17. The display controller as recited in claim 16, wherein the first and second internal pixel-processing pipelines are generic pipelines.

18. The display controller as recited in claim 16, wherein the first internal pixel-processing pipeline is a user interface pipeline, and wherein the second internal pixel-processing pipeline is a video pipeline.

19. The display controller as recited in claim 18, wherein an output frame of the first internal pixel-processing pipeline is combined with at least an output frame of the second internal pixel-processing pipeline in a blend unit.

20. The display controller as recited in claim 15, wherein the control unit is configured to stop issuing memory requests from the first internal pixel-processing pipeline responsive to determining the amount of data in the first line buffer is more than the first programmable threshold and the amount of data in an output buffer is above a second programmable threshold.

* * * * *